United States Patent
Fell et al.

(10) Patent No.: US 9,474,993 B2
(45) Date of Patent: Oct. 25, 2016

(54) FILTRATION APPARATUS

(71) Applicant: Mann+Hummel GMBH, Ludwigsburg (DE)

(72) Inventors: Anthony Fell, Yeovil (GB); Nicholas Foulkes, Chard (GB); Alfred Madden, Liverpool (GB); Glen McGrail, Taunton (GB); Robin Nash, Huntworth (GB); Angus Rouse, Chard (GB)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/466,376

(22) Filed: Aug. 22, 2014

(65) Prior Publication Data

US 2015/0053603 A1  Feb. 26, 2015

(30) Foreign Application Priority Data

Aug. 23, 2013  (GB) .................................. 1315140.2

(51) Int. Cl.
*B01D 33/11* (2006.01)
*B01D 35/30* (2006.01)
(Continued)

(52) U.S. Cl.
CPC ............. *B01D 33/11* (2013.01); *B01D 33/801* (2013.01); *B01D 35/30* (2013.01); *B01D 35/306* (2013.01);
(Continued)

(58) Field of Classification Search
CPC ............. B04B 1/00; B04B 1/02; B04B 1/04; B04B 1/06; B04B 1/08; B04B 1/10; B04B 1/12; B04B 1/14; B04B 1/16; B04B 1/18; B04B 1/20; B04B 1/2008; B04B 5/005; B04B 11/04; B04B 5/12; B04B 9/06; B04B 11/02; B01D 35/306; B01D 2201/316; B01D 2201/34; B01D 2201/347

USPC ........ 494/24, 36, 43, 49, 56, 64, 65, 67, 83, 494/84, 901; 210/360.1, 168, 171, 380.1, 210/416.5

See application file for complete search history.

(56) References Cited

U.S. PATENT DOCUMENTS 4,400,167 A * 8/1983 Beazley .................. B04B 5/005
                                                              210/360.1
4,498,898 A * 2/1985 Haggett .................. B04B 5/005
                                                              494/24

(Continued)

FOREIGN PATENT DOCUMENTS

GB          2465374 A         5/2010
GB          2478578 A         9/2011

OTHER PUBLICATIONS

GB IPO Search report for GB 1315140.2, dated Nov. 25, 2013.

*Primary Examiner* — Krishnan S Menon
*Assistant Examiner* — Waqaas Ali
(74) *Attorney, Agent, or Firm* — James Hasselbeck

(57) ABSTRACT

A filtration apparatus has a housing that has a main housing body and a base closure member. The base closure member is releasably attached to the main housing body, wherein the housing defines an enclosed space. A filter element is disposed in the enclosed space. The housing has a fluid inlet and a fluid outlet. The base closure member has a peripheral channel extending about an entire periphery of the base closure member, wherein the peripheral channel is in communication with the fluid inlet or the fluid outlet of the housing. The base closure member has a fluid inlet passage and/or a fluid outlet passage communicating with the peripheral channel and communicating with the filter element.

6 Claims, 2 Drawing Sheets

(51) Int. Cl.
  *B04B 1/20* (2006.01)
  *B01D 33/80* (2006.01)
  *B04B 5/00* (2006.01)
  *B04B 11/04* (2006.01)
  *B04B 7/02* (2006.01)

(52) U.S. Cl.
  CPC ............ *B04B 5/005* (2013.01); *B04B 7/02* (2013.01); *B04B 11/04* (2013.01); *B01D 2201/316* (2013.01); *B04B 2001/2041* (2013.01)

(56) References Cited

U.S. PATENT DOCUMENTS

| | | | |
|---|---|---|---|
| 4,629,564 A * | 12/1986 | Pinato | B04B 1/14 210/512.3 |
| 4,832,841 A * | 5/1989 | Gutman | B01D 29/52 210/232 |
| 5,342,519 A * | 8/1994 | Friedmann | B01D 35/30 210/232 |
| 5,387,174 A * | 2/1995 | Rochat | B04B 5/0442 494/10 |
| 5,670,042 A * | 9/1997 | Clausen | B01D 29/114 210/238 |
| 5,762,788 A * | 6/1998 | Gullett | B01D 29/21 210/232 |
| 5,795,477 A * | 8/1998 | Herman | B04B 1/08 210/360.1 |
| 5,960,625 A * | 10/1999 | Zdvorak, Sr. | F02C 5/04 60/39.34 |
| 6,224,531 B1 * | 5/2001 | Frehland | B04B 5/005 494/49 |
| 6,238,331 B1 * | 5/2001 | Cox | B04B 5/005 494/49 |
| 6,261,455 B1 * | 7/2001 | Brown | B04B 1/06 210/167.02 |
| 6,322,697 B1 * | 11/2001 | Hacker | B01D 29/055 210/248 |
| 6,354,987 B1 * | 3/2002 | Frehland | B04B 5/005 494/49 |
| 6,363,923 B1 * | 4/2002 | Pletschacher | B01D 57/00 123/585 |
| 6,364,822 B1 * | 4/2002 | Herman | B04B 5/005 494/49 |
| 6,372,006 B1 * | 4/2002 | Pregenzer | A61C 17/046 210/188 |
| 6,409,920 B1 * | 6/2002 | Lee | B01D 29/01 210/232 |
| 6,428,700 B1 * | 8/2002 | Brown | B04B 1/04 210/167.02 |
| 6,540,914 B1 * | 4/2003 | Smith | B01D 29/15 210/297 |
| 6,579,218 B1 * | 6/2003 | May | B04B 1/04 184/6.24 |
| 6,818,046 B1 * | 11/2004 | Lowry | B01D 35/185 210/188 |
| 7,497,887 B2 * | 3/2009 | Baumann | B01D 29/96 210/315 |
| 7,566,294 B2 * | 7/2009 | Amirkhanian | B04B 1/04 494/49 |
| 7,674,376 B1 * | 3/2010 | Herman | B04B 1/04 210/297 |
| 7,897,054 B2 * | 3/2011 | Dolecek | A61M 1/3693 210/512.1 |
| 8,007,669 B1 * | 8/2011 | Chernoff | B01D 29/114 210/232 |
| 2002/0128140 A1 * | 9/2002 | Frehland | B04B 5/005 494/49 |
| 2004/0118752 A1 * | 6/2004 | Simon | B01D 53/00 209/143 |
| 2004/0152578 A1 * | 8/2004 | Samways | B04B 11/06 494/49 |
| 2004/0237792 A1 * | 12/2004 | Hallgren | B01D 45/12 96/281 |
| 2005/0198932 A1 * | 9/2005 | Franzen | B01D 45/14 55/406 |
| 2006/0113235 A1 * | 6/2006 | Strohm | B01D 63/02 210/232 |
| 2006/0258523 A1 * | 11/2006 | Samways | B04B 5/005 494/49 |
| 2007/0051673 A1 * | 3/2007 | Samways | B04B 5/005 210/512.1 |
| 2008/0185326 A1 * | 8/2008 | Serafin | B01D 29/115 210/186 |
| 2009/0025399 A1 * | 1/2009 | Kamen | B01D 1/02 62/6 |
| 2009/0118111 A1 * | 5/2009 | Baumann | B04B 5/005 494/49 |
| 2009/0173675 A1 * | 7/2009 | Scholz | B01D 35/153 210/101 |
| 2011/0003676 A1 * | 1/2011 | Collier | B01D 17/0217 494/23 |
| 2012/0037488 A1 * | 2/2012 | Zebuhr | B01D 1/225 203/4 |
| 2012/0129675 A1 * | 5/2012 | Nash | A61M 1/3693 494/10 |
| 2012/0174545 A1 * | 7/2012 | Tornblom | B04B 5/12 55/447 |
| 2012/0252650 A1 * | 10/2012 | Nash | B04B 1/02 494/36 |
| 2013/0251575 A1 * | 9/2013 | Roof | F04C 23/008 418/55.4 |
| 2014/0069398 A1 * | 3/2014 | Roelver | B01D 45/14 123/572 |
| 2014/0096838 A1 * | 4/2014 | Burns | F16K 1/446 137/15.06 |
| 2015/0014256 A1 * | 1/2015 | Koreis | B01D 35/30 210/767 |

* cited by examiner

FILTRATION APPARATUS

CROSS-REFERENCE TO RELATED APPLICATION

This application claims the benefit of GB patent application no. 1315140.2, filed Aug. 23, 2013; the entire contents of the aforesaid GB patent application being incorporated herein by reference.

BACKGROUND OF THE INVENTION

This invention relates to a filtration apparatus, particularly but not exclusively a centrifugal filter, which is a term sometimes used for a fluid powered centrifugal separator, including a self-driven fluid powered centrifugal separator.

Fluid powered centrifugal separators are well-known for separating fluids of different densities or for separating particulate matter from liquids and have long been used in lubrication systems for engines, particularly diesel powered vehicle engines (automobiles and ships), as well as in other industrial separation processes. The principle of operation of such a separator is that a housing contains a rotor which is supported therein to spin at high speed about a substantially vertical axis. Fluid is supplied at elevated pressure along the axis of rotation, and passes through apertures in a central tube or axial cavity into the chamber of the rotor. Subsequently it is ejected from tangentially directed nozzles in the base of the rotor into the housing from which it drains to a sump. In self-powered separators the drive fluid for the rotor is the contaminated fluid which is to be cleaned. As this fluid passes through the rotor, denser contaminant materials or particles are separated therefrom centrifugally and are retained in the rotor, typically as a cake adhering to the interior surface of the rotor.

The rotor itself is typically formed in two parts as an upper bell shaped cover (referred to herein as a main housing body) and a lower base. In older arrangements, for example as disclosed in GB 2283694A, these were connected together by crimping. In more recent commercial versions of centrifugal separators, the cover is typically threadedly connected to the base and can therefore be unscrewed and screwed on again in servicing operations. In this respect, contaminant debris deposited in the interior of the rotor chamber, most of it adhering to the interior wall, but some not well adhered or lying free within the chamber, needs to be periodically removed. This may be done, for example, once or twice a year during vehicle servicing in the case of centrifugal separators in automotive vehicles, or may be done much more frequently in other industrial uses of centrifugal separators of this self-driven type. An example of this style of design is disclosed in applicant's own earlier GB 2465374A. An alternative design where the cover is connected to the base by means of a quick release clamp is disclosed in the applicant's own earlier GB 2478578A.

In some engine designs, it is now desirable that the cover, namely the main housing body, remains in place, while the base is the part which is removable during servicing. An object of the present invention is to improve the design of centrifugal separators for such purpose.

SUMMARY OF THE INVENTION

In accordance with the present invention, a filtration apparatus is provided that comprises a housing having a main housing body releasably attached to a base (base closure member) to define an enclosed space in which filter means are provided and having a fluid inlet passage to the filter means and/or a fluid outlet passage from the filter means provided in the base, characterised in that the base serves as a removable base closure member of the housing and has a peripheral channel extending around its entire external or internal periphery, which peripheral channel is in communication with a fluid inlet and/or a fluid outlet of the housing, on the one hand, and with the corresponding fluid inlet passage and/or fluid outlet passage provided in said removable closure member, on the other hand.

The removable base closure member may be attached to the main body of the housing by being inserted into an open end of the main housing body, in which case the peripheral channel is formed around its external periphery. In alternative embodiments, the removable base closure member may be attached to the main body of the housing by being placed over an open end of the main housing body, in which case the peripheral channel is formed around the internal periphery of the removable base closure member. In either version, the removable base closure member is preferably sealed relative to the main housing body by respective O-ring seals disposed above and below the peripheral channel.

This design allows greater flexibility than before in feeding fluid to the filter from the same direction in which the filtration apparatus will be accessed for servicing, and avoids any problems in orientation of the base closure member relative to fluid inlet or fluid outlet when the base closure member is removed and replaced. In other words, the peripheral channel avoids rotational misalignment as it no longer matters where the fluid is fed in, or where it exits the filtration apparatus because the peripheral channel allows fluid passage around the entire periphery.

The invention has been proposed in the context of a centrifugal separator in which the filter means (filter element) inside the housing is a self-powered rotor, mounted by opposing pins journalled in respective bearing assemblies provided in/on the main housing body and in/on the removable base closure member. In this context the bearing assembly provided in/on the main housing body may be mounted inside an upper end of the main housing body, which is a closed upper end so that all servicing access can be realized via the removable base closure member.

In some embodiments of the invention, a further fluid inlet passage and/or a further fluid outlet passage may be provided in an extension of the main housing body with said further passage being in communication with the peripheral channel.

However, it will be understood that the invention is not limited to the specific field of centrifugal separators and may be applied more widely to other types of filtration apparatus. For example the proposed construction could be applied to any cartridge filter system, notably full flow oil filters and spin-on filters.

BRIEF DESCRIPTION OF THE DRAWINGS

The invention will be described further, by way of example, with reference to the accompanying drawings.

DESCRIPTION OF PREFERRED EMBODIMENTS

Figure 1:
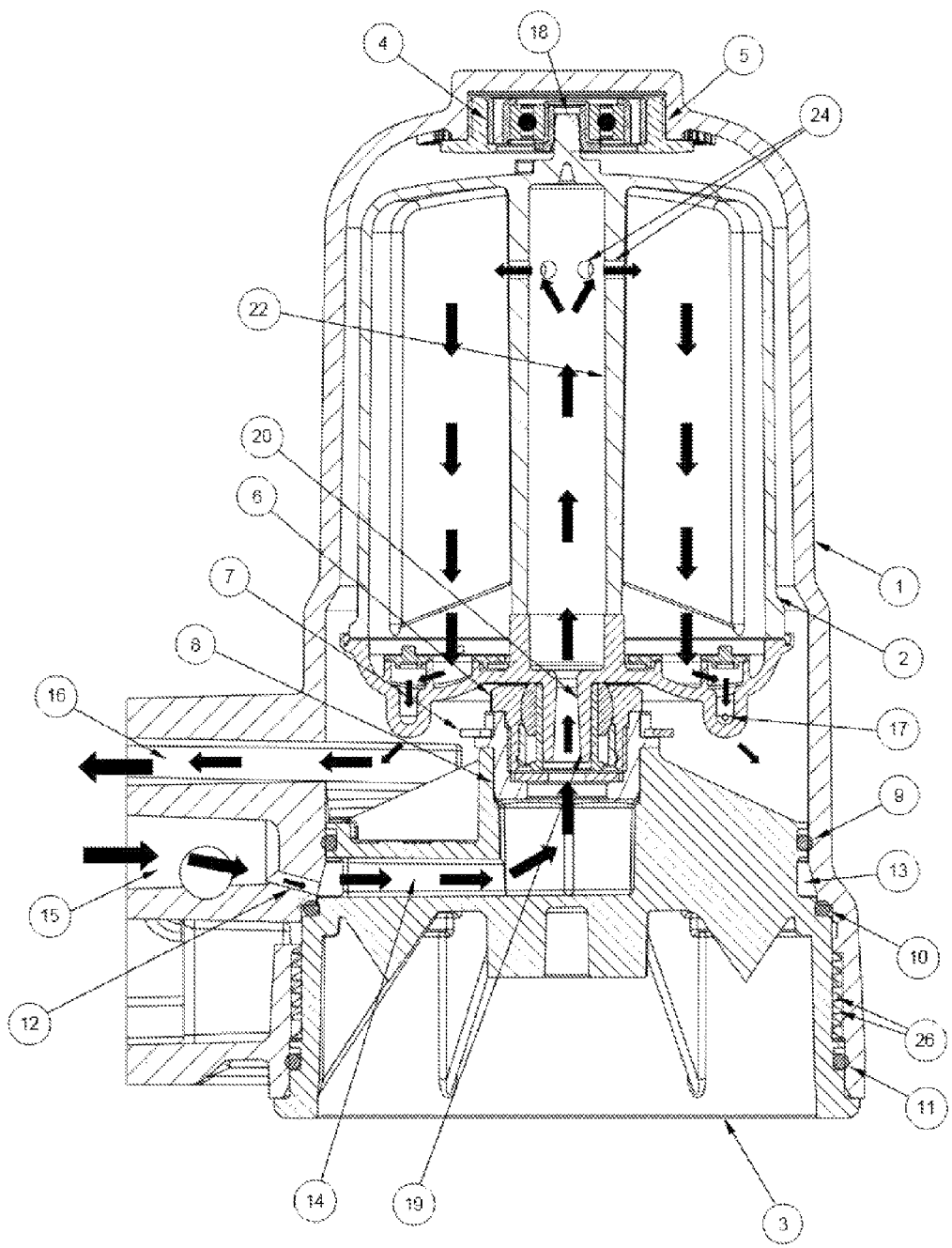
FIG. 1 is a schematic longitudinal cross section of a practical embodiment of a self-powered centrifugal separator in accordance with the invention.

As shown in FIG. 1, this exemplary embodiment of the filtration apparatus has the features of a self-powered centrifugal separator, namely a centrifuge main housing body 1 connected to a base closure member 3. An upper bearing assembly 4 is rigidly fixed into a closed upper end of the housing body 1 and retained there by a threaded sleeve 5. A filter means in the form a rotor 2 is mounted inside the enclosed space provided by the main housing body 1 and the upper bearing assembly 4 allows rotation of the rotor 2, by rotatably supporting a top pin 18 of the rotor 2. The lower end of the rotor 2 has a lower pin 19 in the form of a spigot with an axial bore 20. This spigot 19 is rotatably supported by a lower bearing assembly 6 which is threadedly mounted to an insert 8 which is fastened to the base closure member 3 and positively retained with a circlip 7. The base closure member 3 is in the form of a removable closure member which is inserted into the lower open end of the centrifuge main housing body 1 and sealed in this position by means of O-rings 9, 10 and 11. The rotor 2 has an axial cavity 22 with apertures 24, the cavity 22 communicating with the axial bore 20 in the spigot 19.

The removable base closure member 3 has an annular peripheral channel 13 provided around its entire periphery, and a fluid inlet passage 14 leading from a position within this peripheral channel 13 to an axial location communicating with the bore 20 in the spigot 19.

The main housing body 1, laterally near its lower end, is provided with a fluid inlet 15 communicating to fluid inlet passage 12. It is also provided with a fluid outlet 16 which in the illustrated embodiment is arranged above the fluid inlet 15 and the fluid inlet passage 12.

With the base closure member 3 in position in the lower end of the main housing body 1, as illustrated, the annular peripheral channel 13 in the base closure member 3 is positioned between the two O-ring seals 9, 10 and is thus sealed from a drainage chamber below the rotor 2. The threaded engagement 26 between the base closure member 3 and the main housing body 1 is arranged between the O-ring seals 10 and 11.

In use, pressurized working fluid is supplied to the centrifuge main housing body 1 via the fluid inlet 15. From here, the working fluid passes through the connecting fluid inlet passage 12 to the peripheral channel 13 in the base closure member 3. The fact that the peripheral channel 13 is annular ensures that the working fluid can flow from the connecting fluid inlet passage 12 to the inlet passage 14 through the base closure member 3 regardless of the rotational orientation of the base closure member 3 upon assembly. This is illustrated in FIGS. 2a and 2b.

Figure 2A:
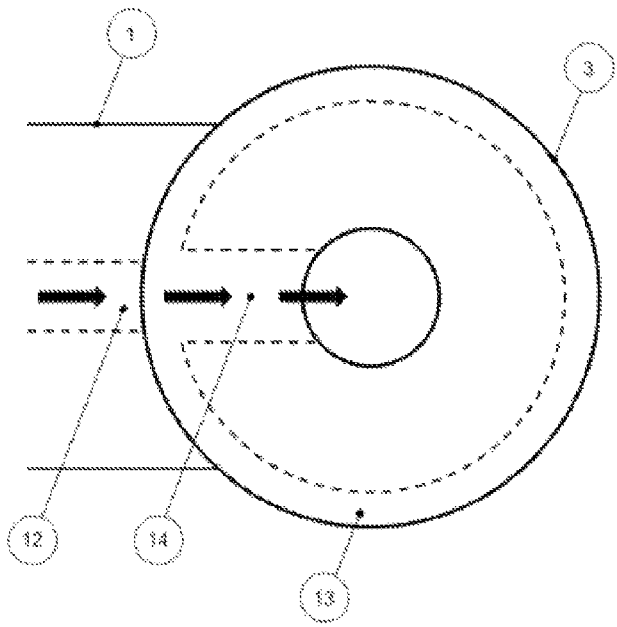
FIGS. 2a and 2b are schematic transverse cross section diagrams at the level of the peripheral channel in the periphery of the removable base closure member of the embodiment of FIG. 1.

In FIG. 2a the removable base closure member 3 is fitted such that the fluid inlet passage 12 in the main housing body 1 is fully aligned with the fluid inlet passage 14 in the closure member 3; therefore, there is no change in direction for incoming working fluid.

Figure 2B:
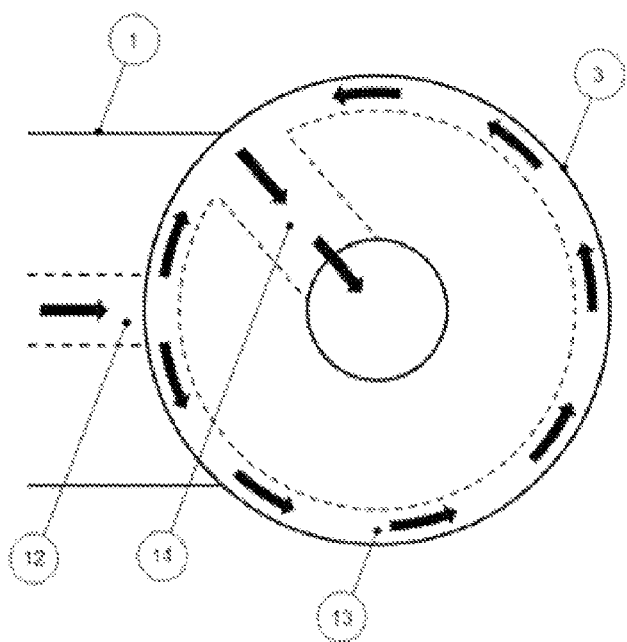

In contrast, in FIG. 2b the removable base closure member 3 is shown as having been fitted with a rotational offset to the main housing body 1 such that the fluid inlet passage 12 in the housing body 1 is not aligned with the fluid inlet passage 14 in the closure member 3. In this instance, the working fluid travels from the first fluid inlet passage 12 through the annular peripheral channel 13, and therefore partially around the exterior of the base closure member 3, and enters the second fluid inlet passage 14 in the base closure member 3 before continuing on the same course as previously described to enter the rotor 2.

Thus, flow of working fluid continues through the fluid inlet passage 14, through the bearing assembly 8, 6 and into the rotor 2. Fluid passes upward through the axial cavity 22 of the rotor 2, passing through the apertures 24 and returning back down the outer chamber of the rotor 2 to exit through nozzles 17 in the base of the rotor 2. As these nozzles 17 are arranged tangentially, the pressure of the working fluid drives the rotor 2 as it exists at the nozzles 17. As the angular velocity of the rotor 2 increases, centrifugal force is developed, separating contaminants from the working fluid within the rotor 2. The working fluid, having left the rotor 2, then returns back to the sump via the fluid outlet 16.

When servicing the centrifugal separator, the base closure member 3 is removed downwards together with the O-rings, 9, 10 and 11 and the lower bearing arrangement, 6, 7 and 8 retained on the closure member 3. The rotor 2 can then be removed from the filtration apparatus (centrifugal separator) in the same downward direction.

By allowing the working fluid to be fed to the rotor 2 through the removable base closure member 3, and without requiring rotational alignment, the filtration apparatus described above is no longer limited to supplying fluid to the rotor 2 through or partially through the main housing body 1. This offers greater flexibility in the arrangement of the filtration apparatus (centrifugal separator) within the overall engine design, particularly allowing working fluid to be fed to the rotor 2 from the same direction as that from which the filtration apparatus (centrifugal separator) will be serviced, thus allowing better access to the inlet passages for the working fluid.

The invention is not restricted to the details of the foregoing embodiment. Although the invention has been developed in the context of a centrifugal separator or cleaning of oil in an automotive vehicle engine, it could equally be applied to any range of liquid systems where a removable closure is provided to the filter housing.

Throughout the description and claims of this specification, the words "comprise" and "contain" and variations of them mean "including but not limited to", and they are not intended to (and do not) exclude other components. Throughout the description and claims of this specification, the singular encompasses the plural unless the context otherwise requires. In particular, where the indefinite article is used, the specification is to be understood as contemplating plurality as well as singularity, unless the context requires otherwise.

Features described in conjunction with a particular aspect, embodiment or example of the invention are to be understood to be applicable to any other embodiment or example described herein unless incompatible therewith. All of the features disclosed in this specification (including any accompanying claims and drawings) may be combined in any combination, except combinations where at least some of such features are mutually exclusive.

What is claimed is:

1. A filtration apparatus comprising:
   a housing comprising
      a main housing body having a chamber within that opens at an open end of the main housing body; and
      a base closure member that is releasably attached to the main housing body closing over the open end, the base closure member closing the chamber defining an enclosed space;

a filter element disposed in the enclosed space;

wherein the filter element having a self-powered rotor mounted to rotate within the enclosed space of the housing;

wherein the main housing body has a fluid inlet and a fluid outlet;

wherein the base closure member has an annular peripheral channel formed on a radially outer surface of the base closure member and extending circumferentially about an entire radially outer periphery of the base closure member, wherein the peripheral channel is closed over on its radially outer side by the main housing body;

wherein the fluid inlet or the fluid outlet of the main housing body opens into the radially outer side of the peripheral channel;

wherein the base closure member has a fluid inlet passage and/or a fluid outlet passage with a first end communicating with the peripheral channel at an interior of the main body housing and a second end communicating with the filter element;

wherein the base closure member has an outer thread threadably engaging with an inner thread of the main body housing, wherein an O-ring seal is arranged better the outer thread and the annular peripheral channel, sealing the annular peripheral channel from the outer thread.

2. The filtration apparatus according to claim 1, wherein the removable base closure member is attached to the main housing body by being inserted into the open end of the main housing body.

3. The filtration apparatus according to claim 1, wherein the removable base closure member is sealed relative to the main housing body by O-ring seals dispose axially above and below the peripheral channel.

4. The filtration apparatus according to claim 1, further comprising
a first bearing assembly arranged in the main housing body and
a second bearing assembly arranged in the removable base closure member,
wherein the self-powered rotor has axially opposing pins,
wherein the opposing pins are journalled to rotate in the first and second bearing assemblies.

5. The filtration apparatus according to claim 4, wherein the first bearing assembly is mounted inside an upper closed end of the main housing body.

6. The filtration apparatus according to claim 1, wherein the filtration apparatus is a centrifugal separator.

\* \* \* \* \*